(No Model.)　　　　　　　　　　　　　　　　　　　2 Sheets—Sheet 2.
J. W. THOMPSON.
VALVE MECHANISM FOR BLOWING ENGINES.
No. 247,857.　　　　　　　　　Patented Oct. 4, 1881.
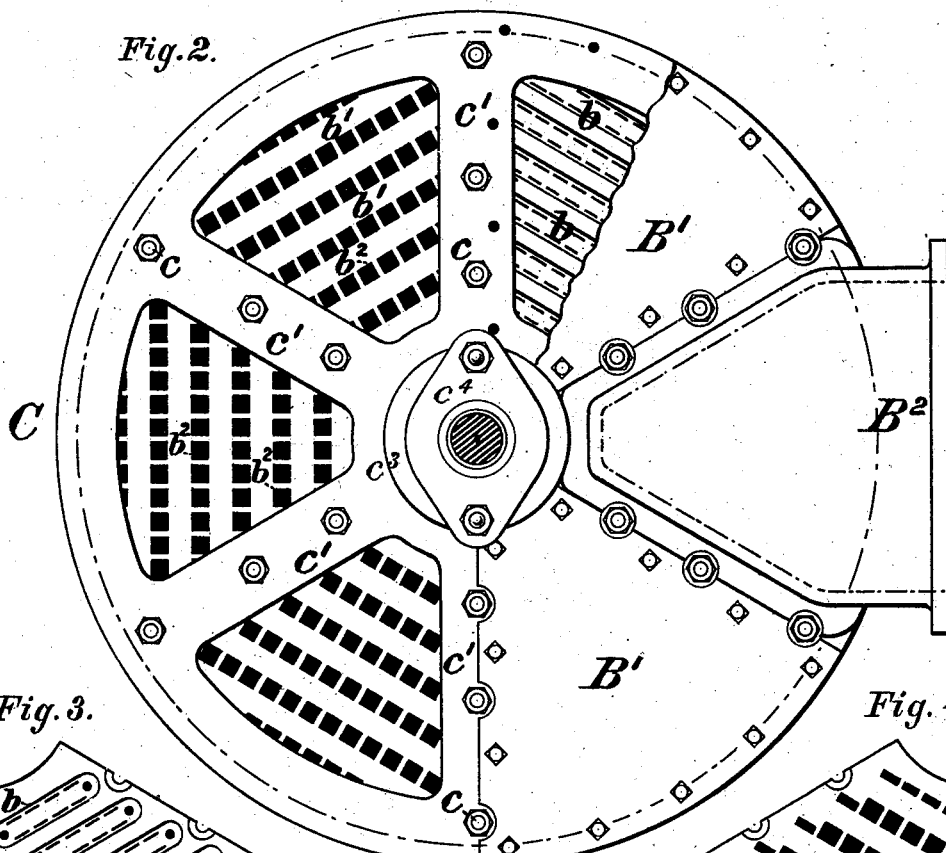
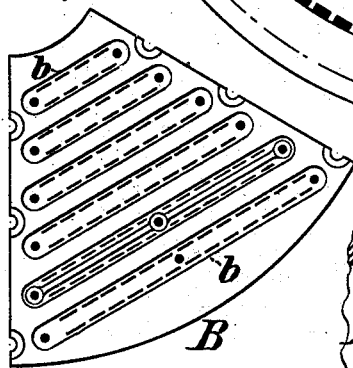
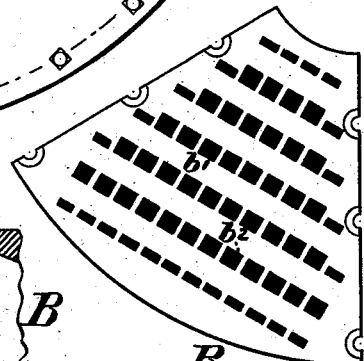
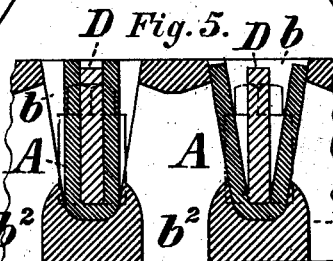
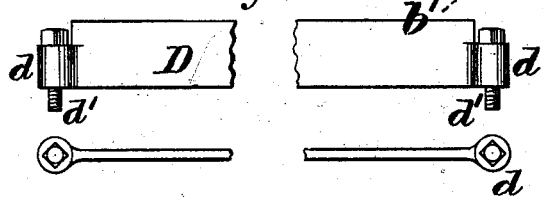
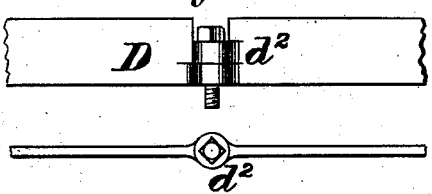
Witnesses　　　　　　　　　　　　　　　　　Inventor
Geo. B. Collier.　　　　　　　　　　　Jas. W. Thompson,
Geo. T. Kelly.　　　　　　　　　　　　by Collier & Bell,
　　　　　　　　　　　　　　　　　　　　　　attys.

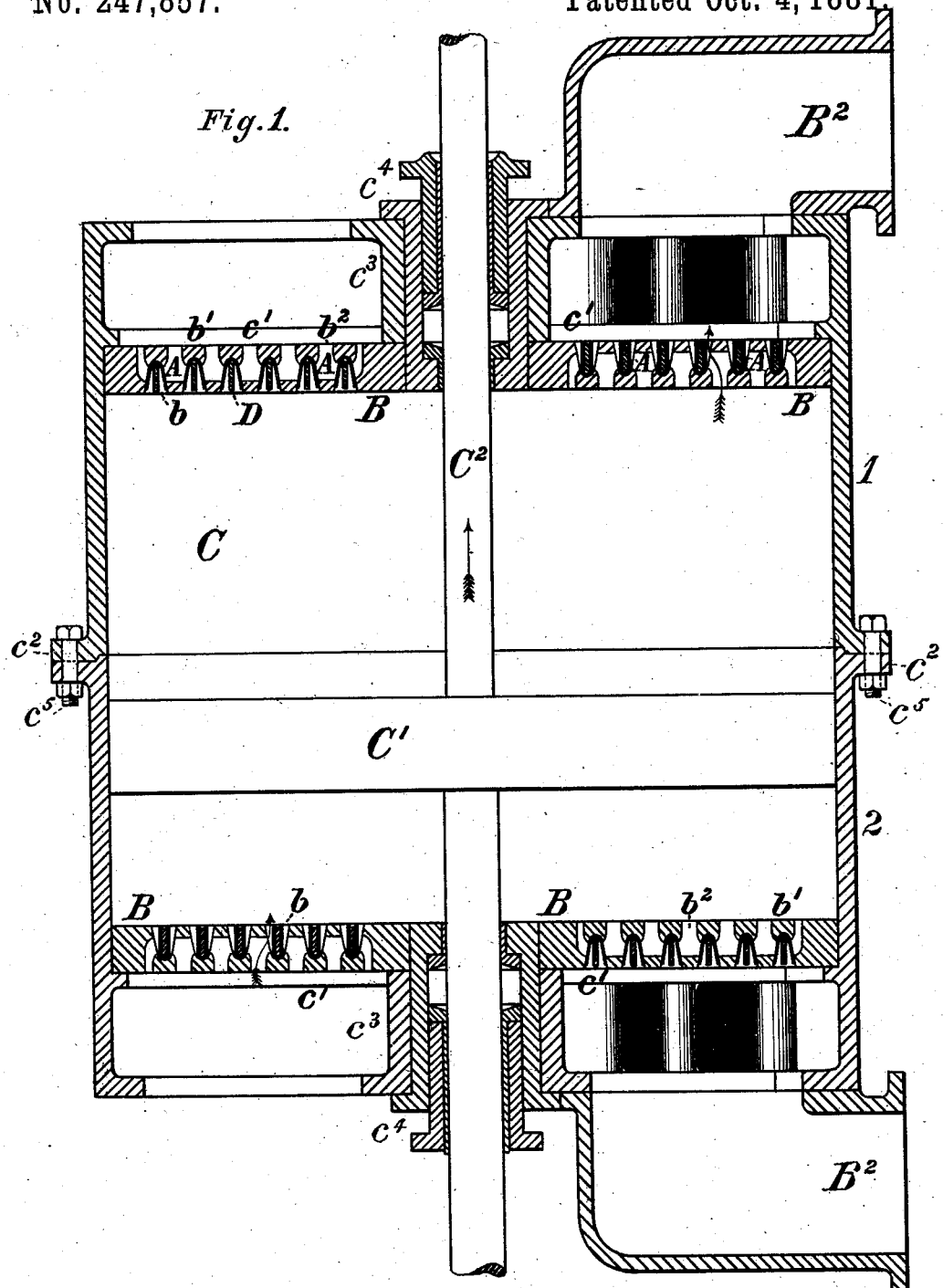

UNITED STATES PATENT OFFICE.

JOSEPH W. THOMPSON, OF SALEM, OHIO, ASSIGNOR OF ONE-HALF TO THE BUCKEYE ENGINE COMPANY, OF SAME PLACE.

VALVE MECHANISM FOR BLOWING-ENGINES.

SPECIFICATION forming part of Letters Patent No. 247,857, dated October 4, 1881.

Application filed July 29, 1881. (No model.)

*To all whom it may concern:*

Be it known that I, JOSEPH W. THOMPSON, of Salem, in the county of Columbiana and State of Ohio, have invented certain new and useful Improvements in Valve Mechanisms for Blowing-Engines, of which improvements the following is a specification.

My invention is specially designed for application to blowing-engines employed to supply air under compression to furnaces in order to enable said engines to be operated at high speeds and to effect higher degree of compression than those heretofore attained, but is equally applicable to other classes of air-compressors and to force-pumps for water and other liquids.

The objects of the invention are, to obtain the greatest practicable amount of opening for the passage of fluid without an objectionable degree of "lift" of the valves; to enable the members which act to hold the valves in place to fulfill the additional function of serving as guards to restrict the degree of opening of the valves to that which is required to insure free passage of fluid and prompt closure; to enable the valves and seats to be located in substantially vertical planes, so as to practically relieve the operating mechanism from the duty of moving the valves against their own gravity;
to so locate the valves and their accessories relatively to the blowing or forcing cylinder as to reduce, as far as may be, the volume of clearance or waste-space in said cylinder; and to facilitate and economize the manufacture of the blowing or forcing cylinder.

To these ends my improvements consist in a valve formed of a sheet or plate of pliable material, doubled or folded upon its medial line; also, in the combination of a valve formed of a sheet or plate of pliable material doubled or folded upon its medial line with a seat having inclined faces, against which said valve is adapted to close; also, in the combination of a doubled or folded pliable valve with a guard or retainer by which it is held in position and the degree of its traverse limited; also, in the combination of a doubled or folded pliable valve with a central guard or retainer and a grooved seat or face; also, in the combination, with a fluid compressing or forcing cylinder, of a head formed of a series of grooved valve-seats provided with valves of pliable material, each doubled or folded upon its medial line and held in position by a central guard or retainer; also, in a blowing or forcing cylinder formed of two sections, each having one of its ends open and flanged and the other end provided with radial arms adapted for the attachment of a head composed of a series of valve-seats, said sections being connected by bolts passing through the flanges of their open ends.

The improvements claimed are hereinafter more fully set forth.

In the accompanying drawings, Figure 1 is a vertical central section through the air-cylinder of a blowing-engine embodying my invention; Fig. 2, a plan or top view of the upper head thereof; Figs. 3 and 4, views of the delivery and receiving sides, respectively, of one of the valve-seats, showing both an open and a closed valve; and Figs. 6 and 7, views in plan and elevation of a short and a long valve-retainer, respectively.

To enable those skilled in the art to practice and carry out my invention, I shall herein describe and show the same as applied to a direct-acting blowing-engine of the class ordinarily employed in connection with blast-furnaces for the reduction of iron from its ores, the adaptation of my improvements to pumps for forcing water and analagous uses being simply a matter of constructive detail and proportions, and involving no departure from the spirit of my invention.

As ordinarily constructed, the heads of the air-cylinders of blowing-engines have been perforated with a series of rectangular openings, arranged in parallel rows and closed by valves formed of strips of gum, leather, or other pliable material, which are of sufficient width to cover two series of openings, and are held in position by bolts and light bars of iron located in line between the two series. The upper inlet-valves and lower delivery-valves (in vertical engines) open downwardly and close upwardly, and the other valves, of course, reversely, thus opposing the gravity of the valves to the power applied to their operation. Under such construction the aggregate area of the openings can readily be made sufficient to admit of the passage of the desired volume of air, but sufficient lift to render such opening practically available cannot be safely allowed the valves. As an alternative arrangement, valves covering only a single series of openings have been employed; but in such case the objection obtains that the attachments of each valve obstruct the delivery of the adjacent valve. It has, further, been proposed to employ loose valves formed of grated plates of pliable material, working between seats and guards, having, respectively, alternately arranged grated openings of corresponding area to those of the valves, which construction, however, fails to fully comply with the requirements of comparatively high compression effected at high piston speed.

In the practice of my invention I provide valves A, each formed of a rectangular strip of leather, rubber, or analogous pliable material, folded or doubled over upon its medial line, and fitted in a groove, $b$, of V-shaped or rhombus section, in a metallic seat, B, which, in the instance shown, forms part of one of the heads of a blowing-cylinder, C, to which is fitted a piston, C', secured upon a piston-rod, C², and reciprocated by the action of steam in a separate cylinder, as usual.

The blowing-cylinder is, by preference, constructed as shown in Figs. 1 and 2—that is, made in two sections, 1 and 2, similar in form, each of which has one of its ends entirely open and surrounded by a circumferential flange, $c^2$, and the other end provided with a series of radial arms, $c'$, extending from the periphery of the cylinder to a central hub or boss, $c^3$, suited to receive a stuffing-box, $c^4$, for the piston-rod C². The arms $c'$ serve for the attachment and support of a series of valve-seats, B, to be presently described, which, when secured in position, fulfill the function of cylinder-heads. The two sections of the cylinder are connected by bolts $c^5$, passing through their flanges $c^2$ and nuts. By this construction the casting and finishing of the cylinder are effected with greater convenience and economy than has heretofore been practicable, as the two similar cylinder-sections are more readily molded than a cylinder of double their length with its separate heads, and the short sections may be finished upon tools which are of more general use and application than those required for boring a full-length cylinder, as a horizontal face-plate pulley-lathe and expensive boring-bars or other special appliances are thus dispensed with.

The valve-seats B are here shown in the form of sectors, which, when united by being secured by bolts $c$ to the arms $c'$ of the cylinder-sections, form complete cylinder-heads. In a horizontal engine the seats may form bonnets or plates fitted to the top or sides, instead of, as in this case, to the ends of the cylinder. The several valve grooves $b$ of each of the sector-shaped valve-seats B are arranged therein parallel one to the other, and, in order to obtain as large an area of opening as practicable, are preferably located perpendicularly to its middle radius, as shown in Fig. 3. The openings of the grooves are in the plane of one face of the seat, and the grooves taper or decrease in width from said face to and terminate in bridges or ribs $b'$, formed in the body of the metal of the seat, in line centrally with the grooves, and serving as the supports of the valves A. The grooves thus present faces inclined from the ribs to the opposite face of the seat-casting, against which faces the flaps or wings of the valve close when in operation.

The seats B are perforated on their faces opposite those in which the openings of the grooves $b$ are located by openings, $b^2$, arranged in series parallel with and between the ribs $b'$, each of the openings in the two outer series communicating with the adjacent groove $b$, and each of those in the remaining series being bifurcated toward its inner end, so as to communicate with the two grooves between which it is located, as seen in Fig. 5. The valves, after having been folded or doubled over upon their medial lines, are inserted in their respective grooves, and secured therein by guards or retainers D, each of which is a rectangular plate of metal provided with end lugs, $d$, to receive bolts $d'$, by which it is clamped to one of the ribs $b'$ of the seat, holding its valve A firmly thereto upon its medial line, while permitting the free movement of the pliable flaps or wings of the valve on each side in the groove $b$, and, further, acting as a stop to limit the degree of traverse of the wings. The character and range of the movement of the wings is illustrated in Fig. 5, in which the left-hand valve is shown as fully open and the right as fully closed.

The guards of the longer valves may have an intermediate lug, $d^2$, and bolt, in addition to those at their ends, as shown in Fig. 7, to insure the holding of the valves firmly to their seats, and said guards may be made in one or in two pieces, as preferred.

The seats of the inlet or receiving valves are secured in position in the cylinder with the openings $b^2$ outward and communicating with open spaces left between the arms $c'$, to which the seats are bolted, so as to freely receive the external air and admit of its passage through the valves adjacent to them into the cylinder. The seats of the delivery-valves are secured in reverse position—that is, with the openings $b^2$ on their inner sides—and the spaces between the arms $c'$, by which they are held, are covered by tight bonnets B', one of which in each head is provided with a nozzle, B², for the attachment of a pipe, through which the air delivered by the valves is supplied to a blast-reservoir or to a furnace, as may be desired. The arms on each side of the delivery-nozzles B² are pierced by openings (shown in solid black in Fig. 1) of sufficient area to permit of the free passage to the nozzles of the air delivered by the valves in the seats on each side of said nozzles.

By the use of my improvements an ample passage for air or other fluid is provided, with a comparatively-slight degree of traverse of the valves, thus enabling the engine to be satisfactorily operated at high speeds, and the relation of the inclined wings or flaps of the valves to the surfaces against which they close is such as to obviate the rapid wear which occurs in the ordinary construction. Moreover, the attachment and removal of the valves and their accessories, for renewal or repair, can be readily effected, and, by the location of the entire series of valves within heads presenting plane surfaces throughout on the sides adjacent to the piston, the amount of clearance and consequent waste space is reduced to a minimum.

I claim as my invention and desire to secure by Letters Patent—

1. A valve for blowing or pumping engines formed of a sheet or plate of pliable material doubled or folded over upon its medial line, substantially as set forth.

2. The combination of a valve having pliable wings or flaps with a plate or guard by which said valve is retained in position and limited as to the traverse of its wings, substantially as set forth.

3. The combination of a doubled or folded pliable valve and a seat having inclined faces against which said valve is adapted to close, substantially as set forth.

4. The combination of a doubled or folded valve, a grooved seat, and a central guard or retainer, substantially as set forth.

5. A valve-seat having a series of grooves of V-shaped or rhombus section extending from a plane outer face on one of its sides to a series of transverse ribs upon the other, and a series of openings on the side of the seat adjacent to said ribs communicating with the grooves, substantially as set forth.

6. The combination, with a fluid compressing or forcing cylinder, of a series of receiving and delivery valves which close against inclined surfaces located entirely within heads fitting the bore of the cylinder and presenting plane surfaces on their inner sides, substantially as set forth.

7. The combination, with a fluid compressing or forcing cylinder, of an internally plane-surfaced head extending from its periphery to a central sleeve, and formed of a series of sector-shaped valve-seats, each having doubled or folded pliable valves secured by central guards or retainers within grooves of V-shaped or rhombus section, communicating by openings with the opposite side of the seat, substantially as set forth.

8. A fluid compressing or forcing cylinder formed of two sections, each having one of its ends open and flanged and the other end provided with radial arms adapted for the attachment of a head composed of a series of valve-seats, said sections being connected by bolts passing through the flanges of their open ends, substantially as set forth.

JOSEPH W. THOMPSON.

Witnesses:
HENRY C. JONES,
GEO. W. HENDERSON.